(No Model.)
B. MASTERSON.
WASHER FOR VEHICLE WHEELS.
No. 296,029. Patented Apr. 1, 1884.
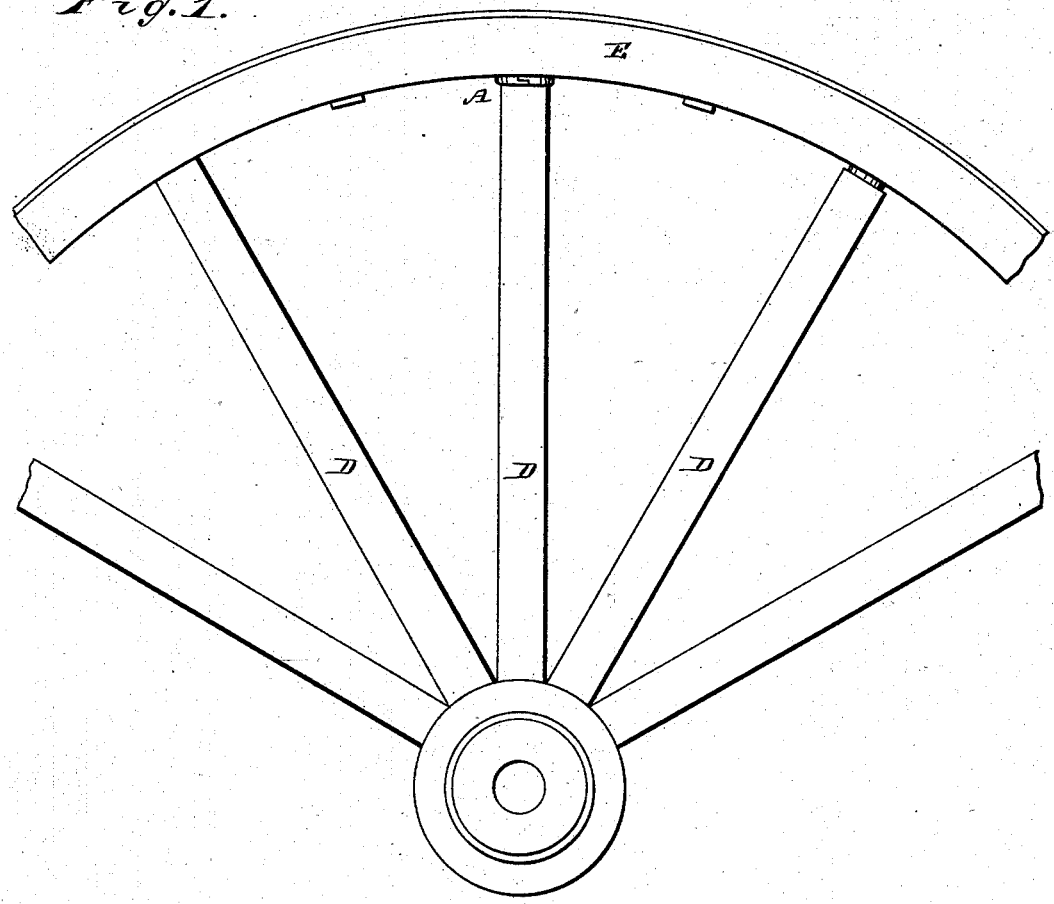
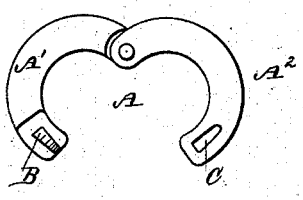
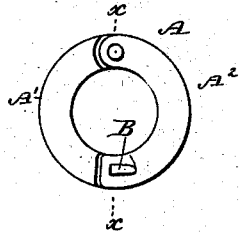
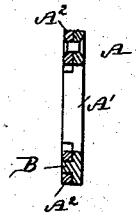
WITNESSES:
Theo. G. Hoster
C. Sedgwick
INVENTOR:
B. Masterson
BY Munn & Co.
ATTORNEYS.

UNITED STATES PATENT OFFICE.

BARTHOLOMEW MASTERSON, OF MILFORD, MASSACHUSETTS, ASSIGNOR TO HIMSELF AND JOHN W. ELDREDGE, OF SAME PLACE.

WASHER FOR VEHICLE-WHEELS.

SPECIFICATION forming part of Letters Patent No. 296,029, dated April 1, 1884.

Application filed October 8, 1883. (No model.)

*To all whom it may concern:*

Be it known that I, BARTHOLOMEW MASTERSON, of Milford, in the county of Worcester and State of Massachusetts, have invented a new and Improved Washer for Vehicle-Wheels, of which the following is a full, clear, and exact description.

The object of my invention is to provide a new and improved washer which can be placed between the shoulder of a spoke and the felly, to fill the space between the said shoulder and the felly, and thus prevent rattling.

Reference is to be had to the accompanying drawings, forming a part of this specification, in which similar letters of reference indicate corresponding parts in all the figures.

Figure 1 is a side view of part of a wheel provided with my improved washer. Fig. 2 is a plan view of the washer, showing it opened. Fig. 3 is a plan view of the same, showing it closed. Fig. 4 is a cross-sectional elevation of the same on the line $x\,x$, Fig. 3.

The washer A is composed of two flat half-rings, $A'\,A^2$, hinged to each other in such a manner that both sides will be in the same plane. The half-ring $A'$ is provided at its free end with a beveled stud, B, and the half-ring $A^2$ is provided with a slot, C, through which the said beveled stud can be passed for the purpose of holding the free ends of the half-rings together, and thus closing the washer. If the fellies of a wheel shrink, there will be a small space between the felly and the shoulder of the spoke, and as the spoke can move in the direction of its length the distance between the shoulder and the felly, the spoke and wheel will rattle. To prevent this, my improved washer is passed around the spoke above the shoulder, so that the said washer will be between the shoulder and the felly, and will thus prevent any longitudinal movement of the spoke. As the washer is jointed or hinged, it can be secured on a spoke very easily and rapidly, and the felly need not be removed.

I am aware that it is not new to use a split washer of leather or other equivalent material on a spoke-tenon between the shoulder and the felly; but

What I claim as new and of my invention is—

1. A spoke-tenon washer made of two parts hinged together and rabbeted on opposite sides at their adjacent ends, to bring all parts in the same plane, as shown, whereby they may be made of metal or other non-flexible material, and yet may be applied without removing the tire or felly.

2. A jointed washer formed of the flat half-ring $A'$, provided at its free end with a beveled stud, B, and the flat half-ring $A^2$, provided at its free end with a slot, C, the half-rings $A'\,A^2$ being pivoted to each other, substantially as herein shown and described.

BARTHOLOMEW MASTERSON.

Witnesses:
GEO. G. PARKER,
LEWIS HAYDEN.